March 1, 1966  C. P. OUELLETTE  3,237,370
PACKAGING MACHINE
Filed June 21, 1962  10 Sheets-Sheet 1
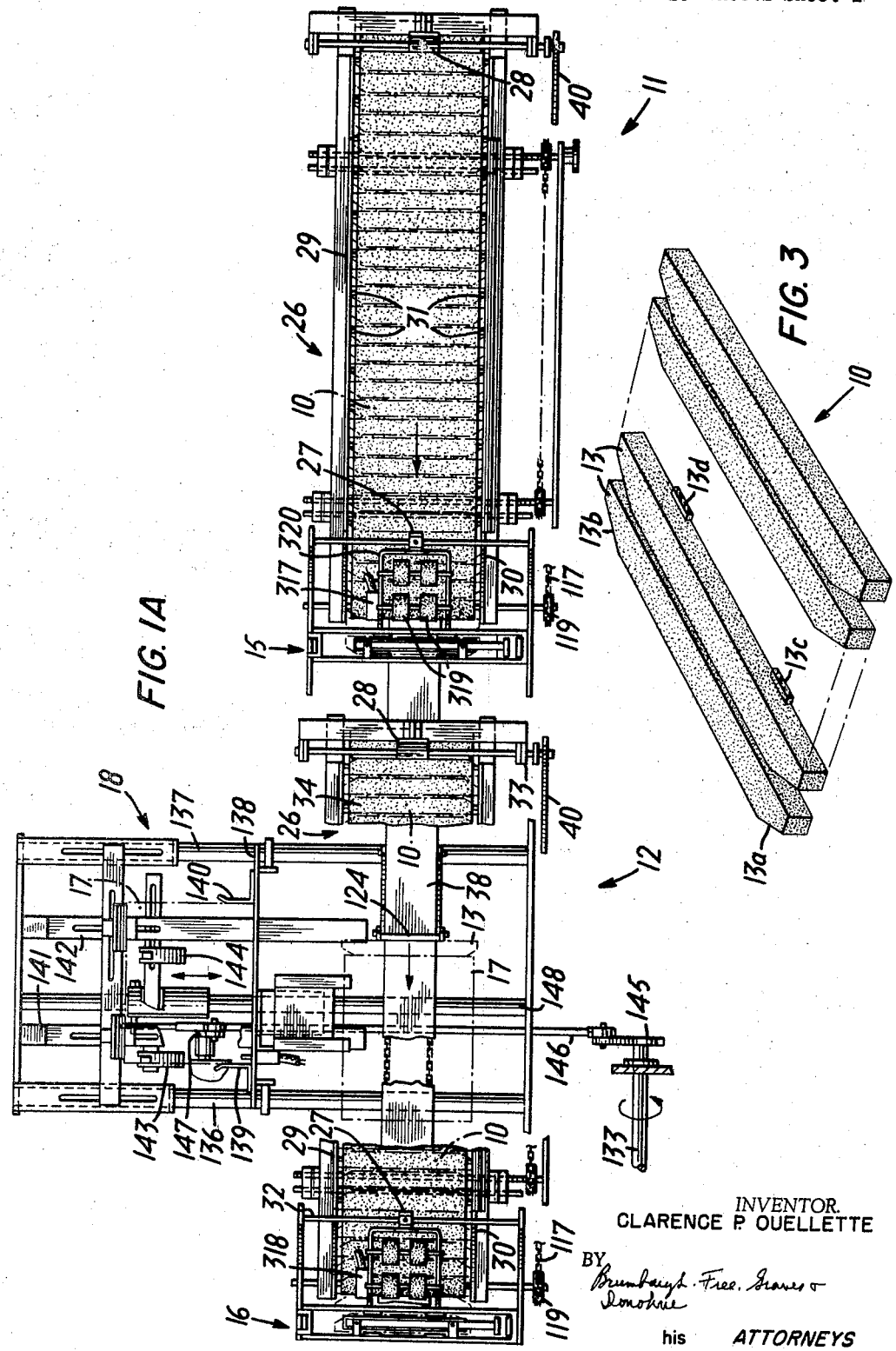
INVENTOR.
CLARENCE P. OUELLETTE
BY Brumbaugh, Free, Graves & Donohue
his ATTORNEYS

INVENTOR.
CLARENCE P. OUELLETTE his ATTORNEYS

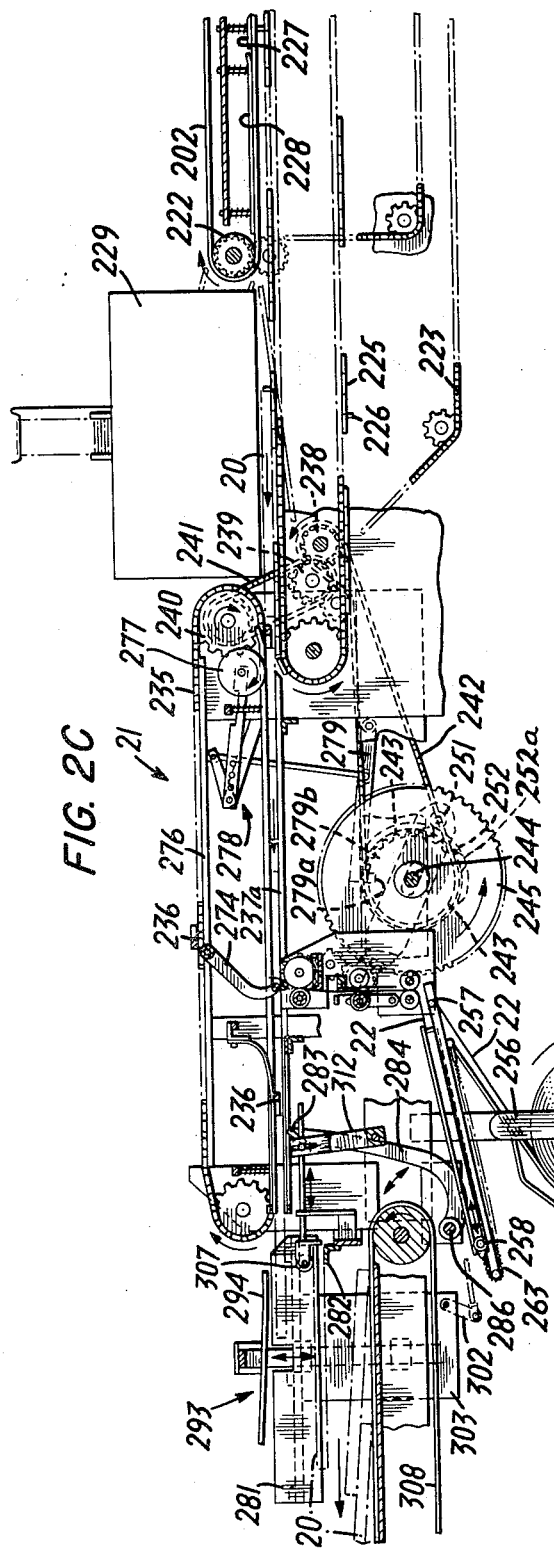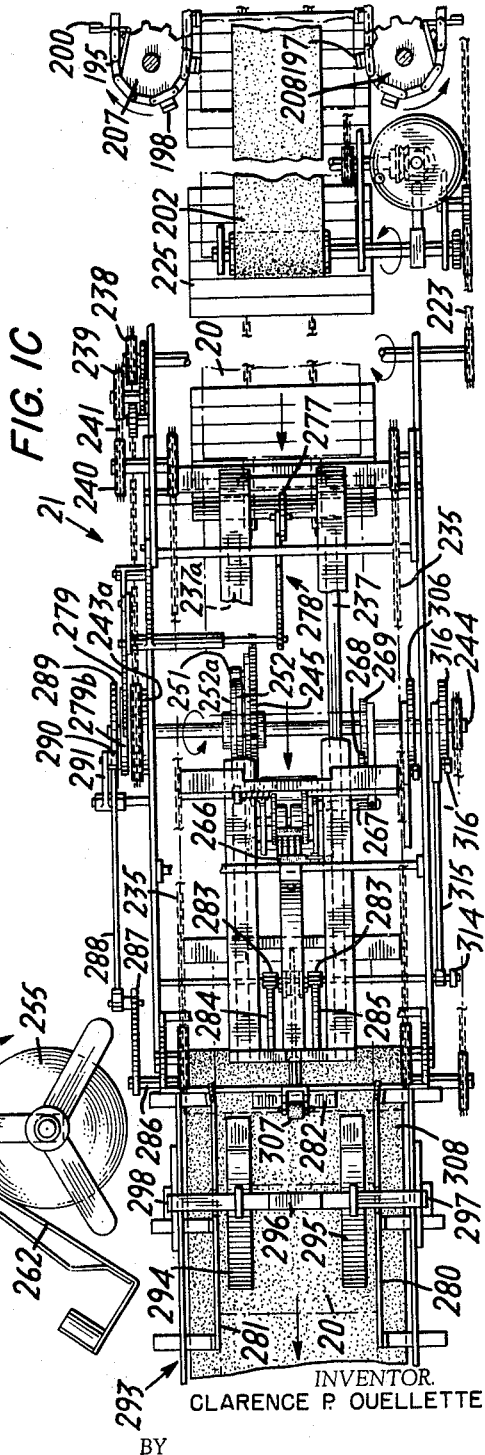

March 1, 1966

C. P. OUELLETTE 3,237,370

PACKAGING MACHINE

Filed June 21, 1962

INVENTOR.
CLARENCE P. OUELLETTE

BY his ATTORNEYS

March 1, 1966 C. P. OUELLETTE 3,237,370
PACKAGING MACHINE
Filed June 21, 1962 10 Sheets-Sheet 5
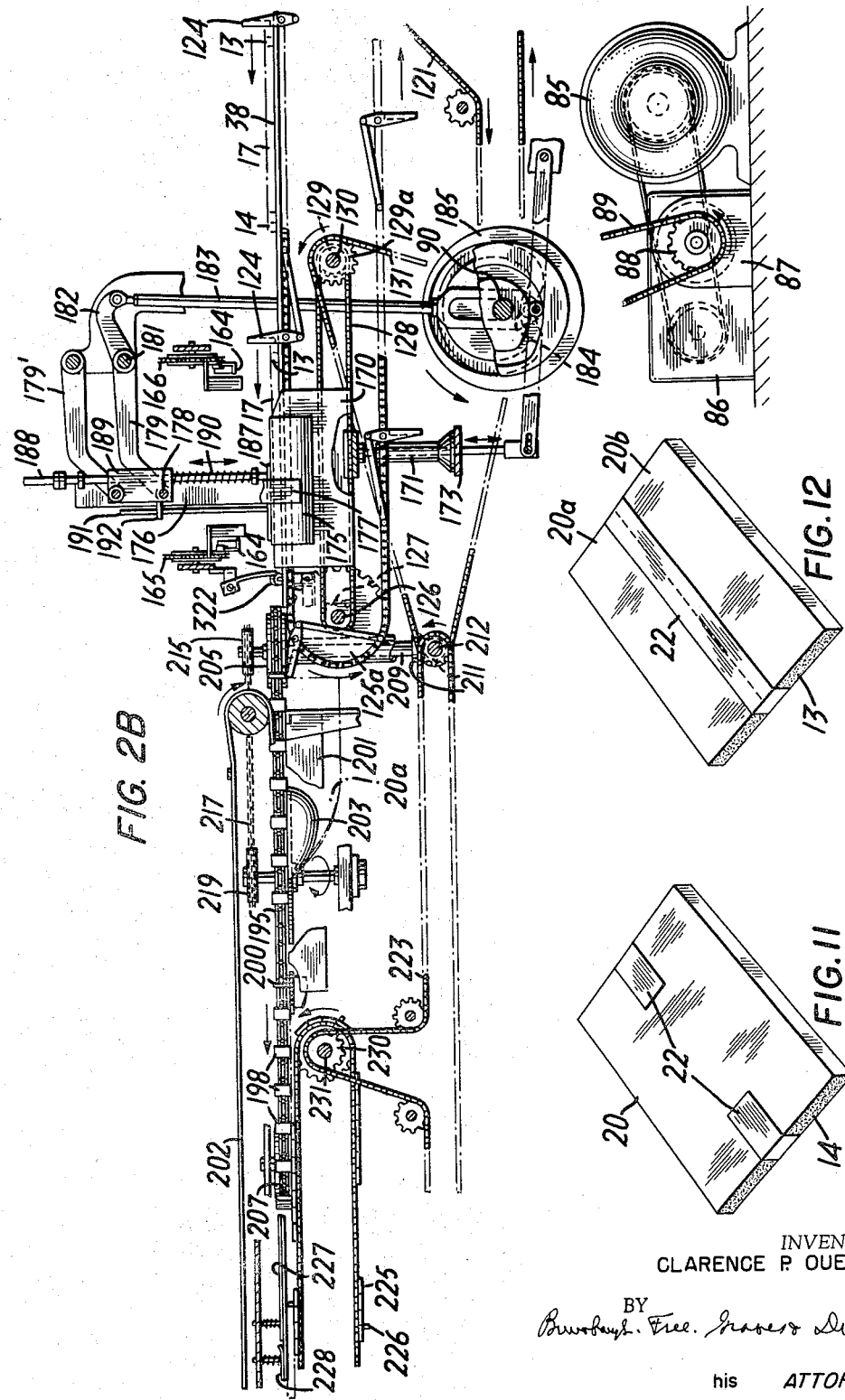
INVENTOR.
CLARENCE P. OUELLETTE
BY
his ATTORNEYS

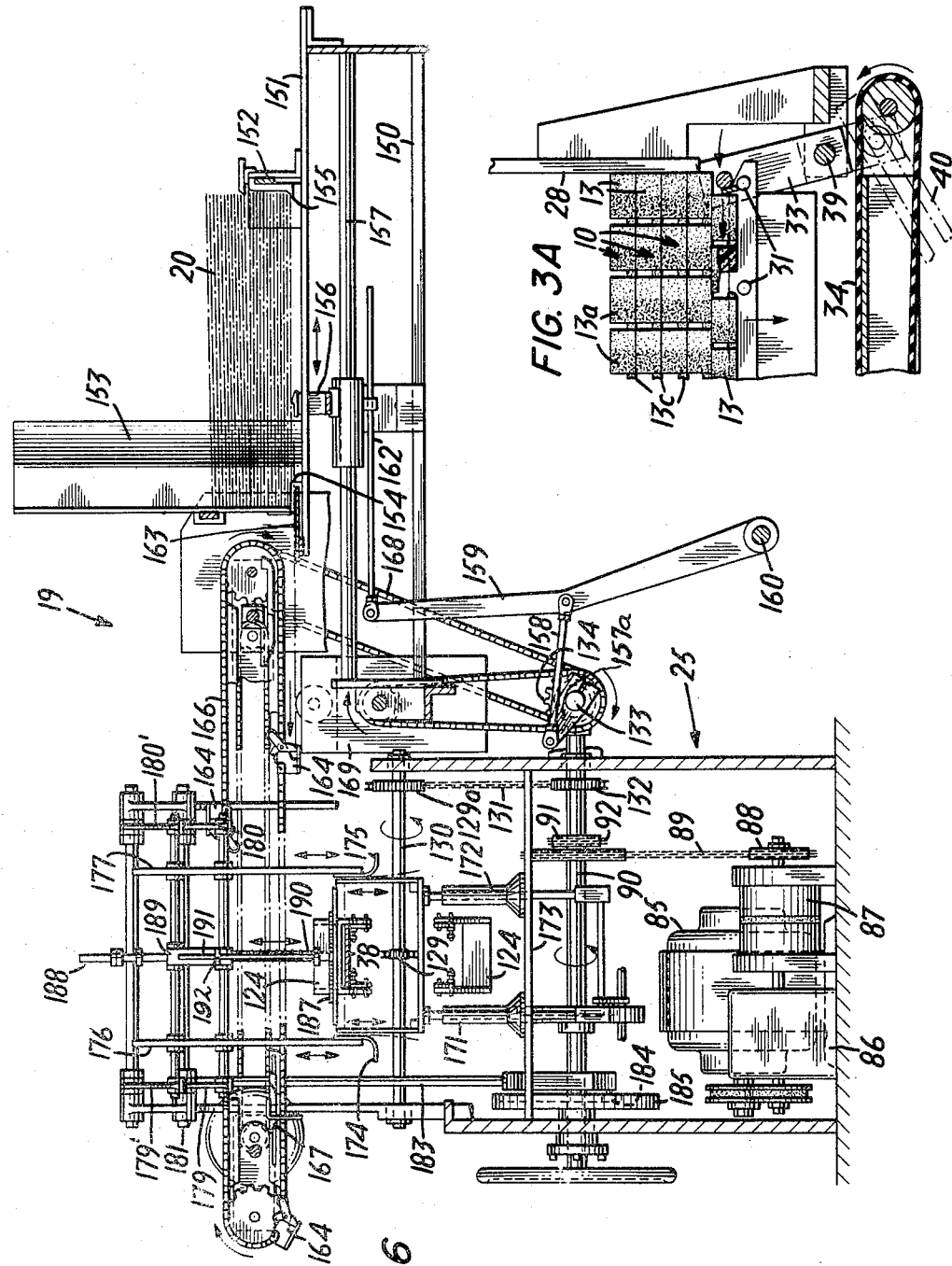

March 1, 1966 C. P. OUELLETTE 3,237,370
PACKAGING MACHINE
Filed June 21, 1962 10 Sheets-Sheet 7

INVENTOR.
CLARENCE P. OUELLETTE
BY
his ATTORNEYS

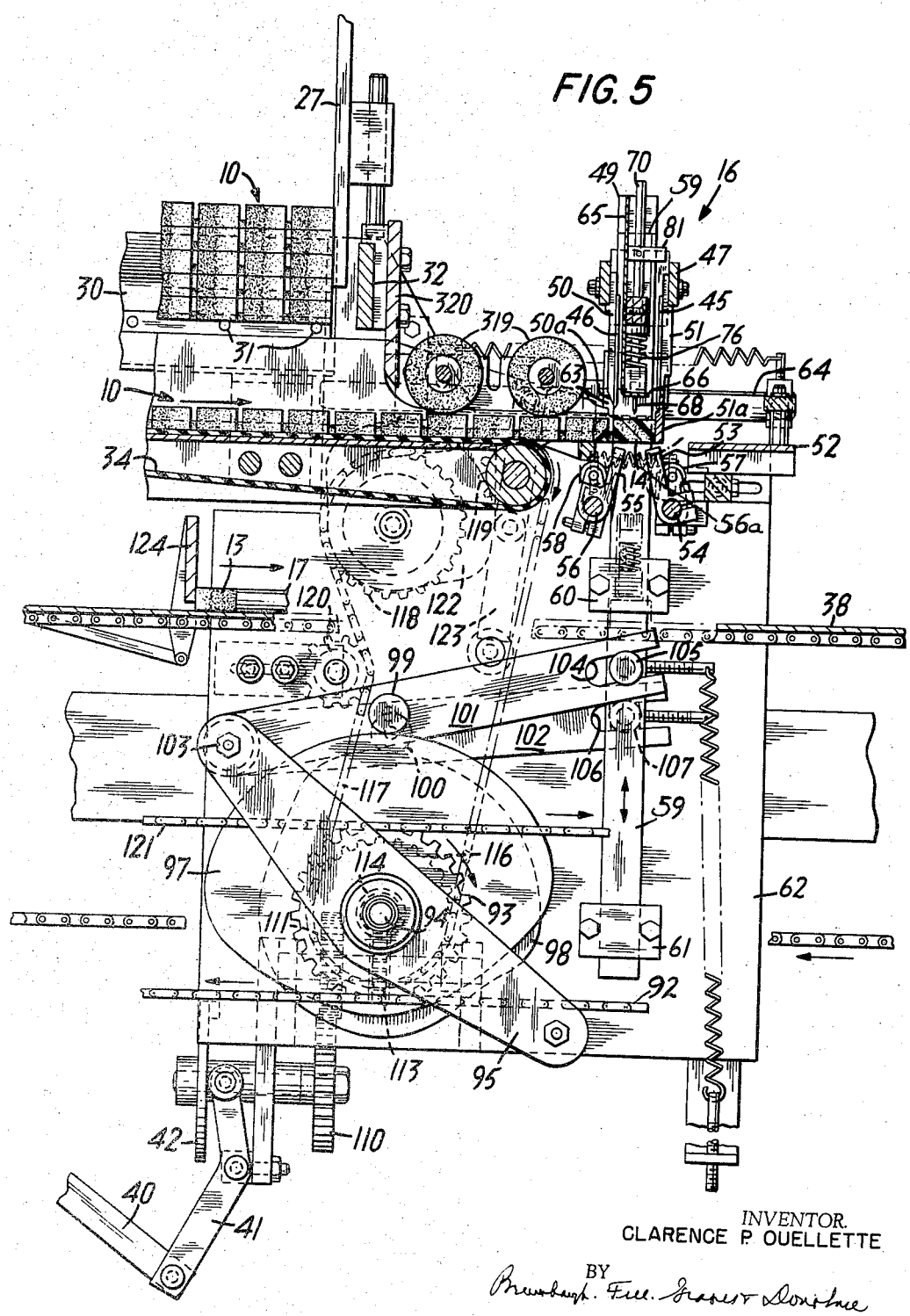

March 1, 1966
C. P. OUELLETTE
3,237,370
PACKAGING MACHINE
Filed June 21, 1962
10 Sheets-Sheet 9
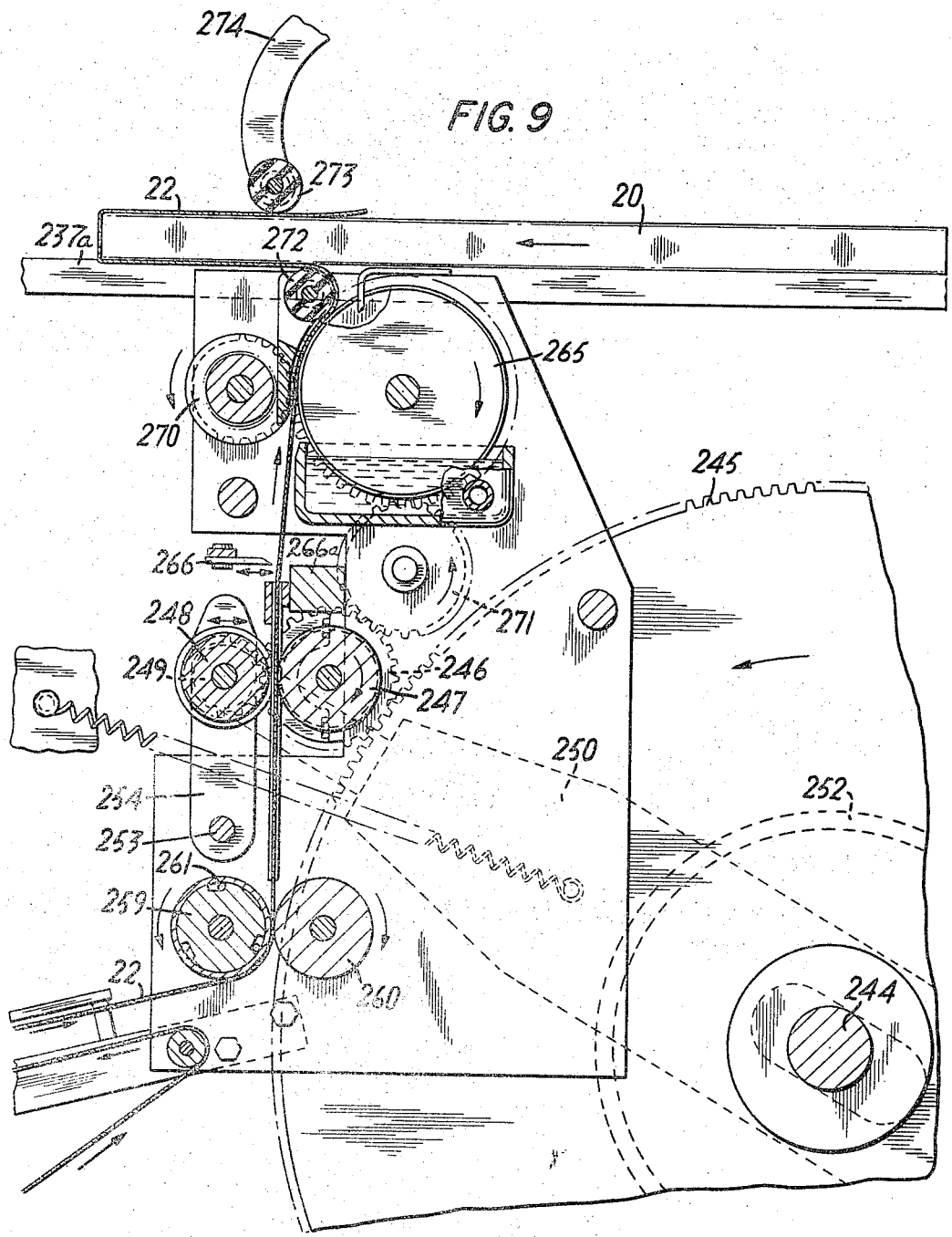
INVENTOR.
CLARENCE P. OUELLETTE
BY
his ATTORNEYS

INVENTOR.
CLARENCE P. OUELLETTE

BY
his ATTORNEYS

United States Patent Office 3,237,370
Patented Mar. 1, 1966

3,237,370
PACKAGING MACHINE
Clarence P. Ouellette, East Long Meadow, Mass., assignor, by mesne assignments, to West Virginia Pulp and Paper Company, New York, N.Y., a corporation of New York
Filed June 21, 1962, Ser. No. 204,142
17 Claims. (Cl. 53—137)

This invention relates to methods and machines for wrapping and packaging articles and it relates more particularly to the wrapping of books, catalogues and other articles for handling and shipping.

It is common practice to package articles such as books for direct shipment through the mails to subscribers or members of book clubs and the like. Ordinarily, the book is enclosed in a carton or a wrapper formed of corrugated board or the like which fits around the book or other article rather snugly and is intended to protect the article against damage during transportation or shipment. However, frequently the packages are dropped or subjected to impact with the result that a corner or corners of the carton or wrapper are indented, at the same time bending the corners of the cover of the book or the other article enclosed in the carton or wrapper. With books of value and particularly books of which a collection is being made, considerable customer dissatisfaction results when a book having a damaged or marred cover is received. Even substantial reinforcement or the use of heavy carton material does not completely prevent damage to the covers of the books when they are subjected to rough handling, as is frequently the case.

In accordance with the present invention, a method and apparatus are provided for enclosing a book or similar article in a package or wrapper which protects the book and especially the corners of the article against damage during shipment and handling and moreover, enables the production of packages at speeds not heretofore possible with existing machinery.

More particularly in accordance with the invention, a typical package for a book or the like includes a bumper strip of relatively rigid but crushable material such as for example a semi-rigid, foam plastic strip at each end of the book and a wrapper of suitable material, such as corrugated board, cardboard or the like wrapped around the book and adhered to the bumper strips thereby to form a complete self-contained package in which the ends of the book are protected by the bumper strips. By arranging the bumper strips so that they form the ends of the package and extend a substantial distance into the package, even substantial destruction of the corner of the package will have no affect on the article contained in the package. As a further prevention of damage to the articles, the inner corners of the bumper strips may be mitered to provide relief spaces for inward collapse of the corners of the package without even forcing the ends of the bumper strips into engagement with the corners of the article in the package.

In apparatus of the type embodying the present invention, the bumper strips are severed from sheets of interconnected bumper strips and placed upon a traveling conveyor belt to receive a book or similar article between them, the books being fed onto the conveyor from a stack thereof. A wrapper of corrugated board or the like having adhesive applied to two opposite lateral edges is placed on top of the assembly of the article and the bumper strips so that the wrapper is adhered to the bumper strips. Folding members on the machine fold extending portions of the wrapper beneath the article and the bumper strips, and engage and adhere marginal portions of the folded portions to the under surfaces of the bumper strips at opposite ends. The package is then sealed with a strip of a tape which extends from the top of the wrapper across the end thereof and along the opposed edges of the flaps of the wrapper and upwardly and around and onto the top of the wrapper thereby forming a sturdy, damage-resistant package providing adequate protection to its contents. All of the operations can be conducted by the machine while the components of the finished package are being moved in a continuous uninterrupted sequence so that exceedingly high production rates are achieved.

The resulting packages, due to the excellent protection afforded the article therein can be shipped direct without further wrapping and with the assurance that the contents of the package will reach the consumer in undamaged condition.

For a better understanding of the present invention, reference may be had to the accompanying drawings in which:

FIGURES 1A to 1C are a broken plan view of a typical apparatus embodying the present invention;

FIGURES 2A to 2C are a broken side elevational view of the apparatus;

FIGURE 3 is a perspective view of a portion of a sheet of bumper strips partially broken away to disclose details thereof;

FIGURE 3A is a view in section of a portion of the apparatus feeding sheets of bumper strips from a stack thereof;

FIGURE 5 is a view in section taken on line 5—5 of FIGURE 4;

FIGURE 6 is a view in section taken on line 6—6 of FIGURE 1B;

FIGURE 9 is a view in vertical section through a portion of the tape applicator of the machine;

FIGURE 11 is a top perspective view of the finished package; and

FIGURE 12 is a bottom perspective view thereof.

Figure 1B:
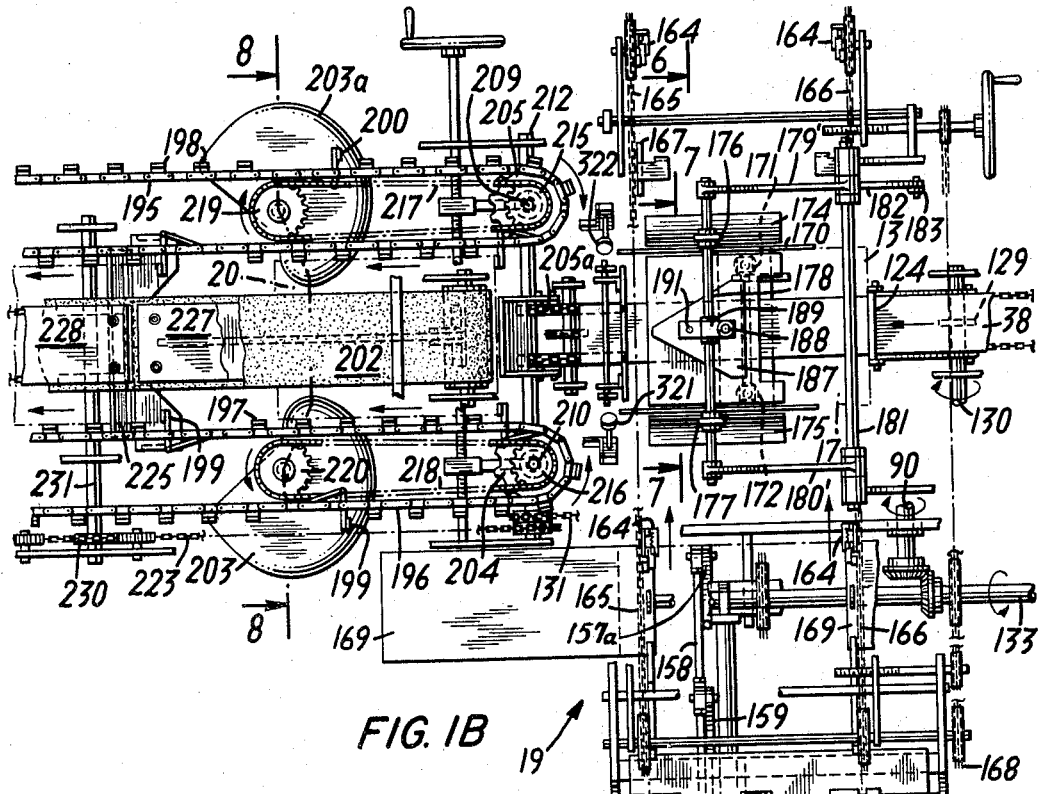

Before proceeding with an explanation of the details of operation and structure of a typical apparatus embodying the invention as disclosed in the drawings, the sequence of wrapping an article and forming a finished package containing the article will be described first. Referring to FIGURES 1A to 1C, FIGURES 2A to 2C and FIGURE 3, sheets 10 of bumper strip material are introduced into the two strip feeding devices 11 and 12 of the apparatus and from which individual strips 13 and 14 are severed by means of shears 15 and 16 and deposited and located at opposite ends of an article, such as a book 17, supplied from a feed mechanism 18. The bumper strips 13 and 14 with the book 17 interposed between them are carried past a wrapper feeding mechanism 19 (FIGURES 1B and 2C) and a wrapper 20 (FIGURE 6) is fed into superimposed relation on top of the book and bumper strip assembly and adhered to the tops of the bumper strips by means of strips of adhesive applied to the edges of the wrapper 20 extending parallel with the bumper strips 13 and 14. Each wrapper 20 is of greater transverse width than the length of the strips 13 and 14 and the width of the book by a sufficient amount to extend around the ends of the bumper strips and to substantially meet in opposing relation along the longitudinal center line of the book 17.

Figure 7:
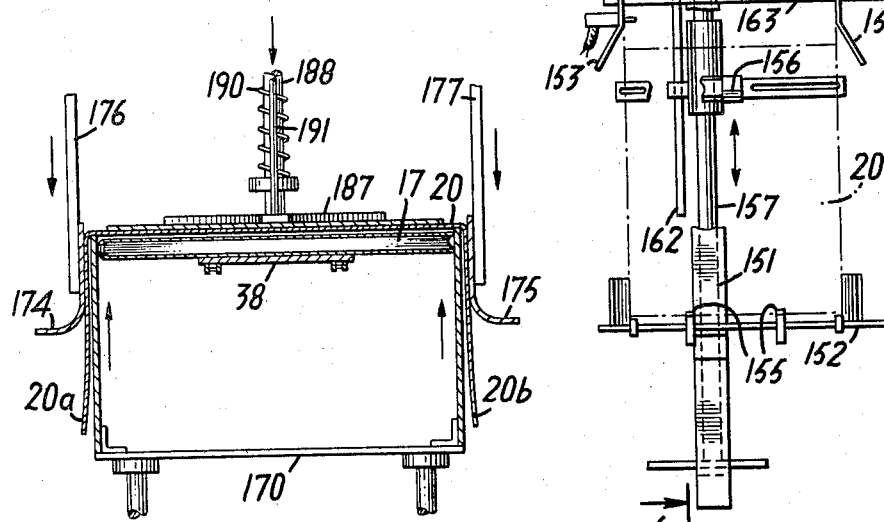
FIGURE 7 is a view in section taken on line 7—7 of FIGURE 1B.
Figure 8:
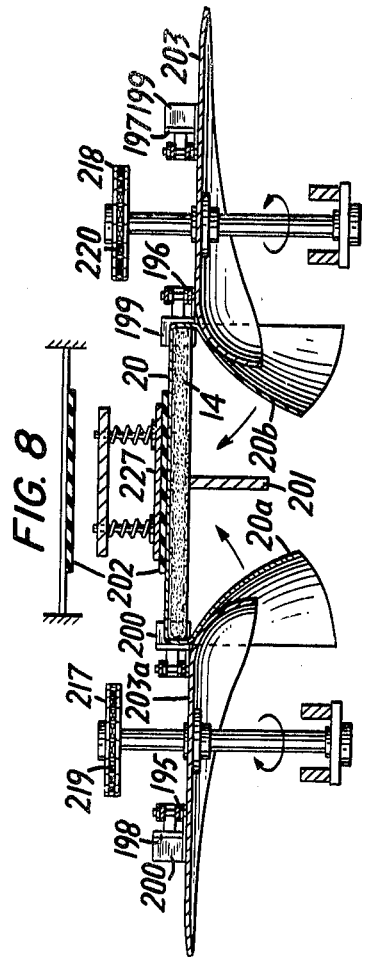
FIGURE 8 is a view in section taken on line 8—8 of FIGURE 1B.
Figure 4:
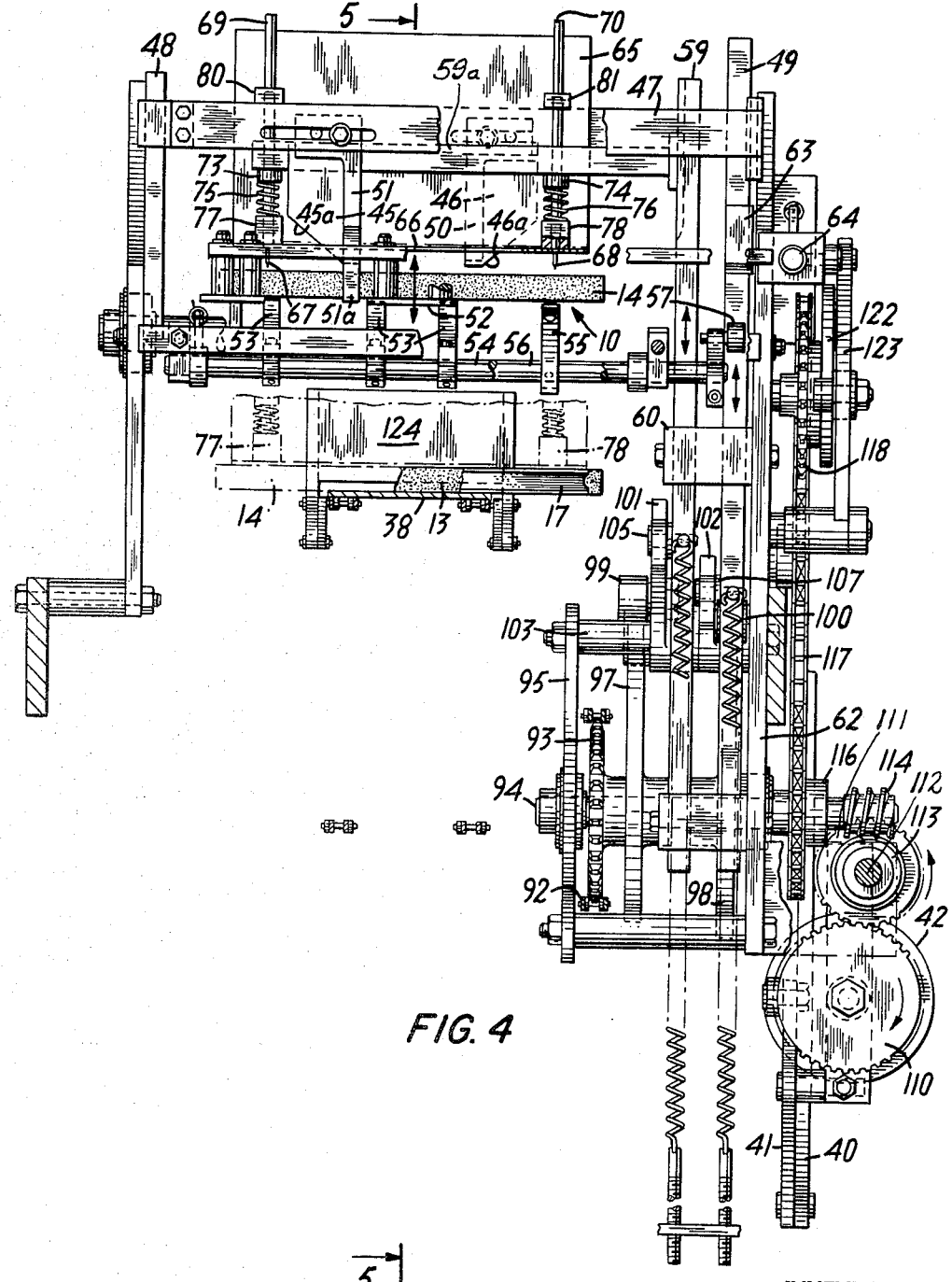
FIGURE 4 is a view in section taken on line 4—4 of FIGURE 2A.

As indicated in FIGURES 7 and 8, the lateral edge portions 20a and 20b of the wrapper 20 are folded downwardly and then inwardly to engage the undersurfaces of the book 17 and the undersurfaces of the bumper strips 13 and 14 to which the edges of the wrapper adhere. The package is then transferred to a tape applicator 21 (FIGURES 1C and 2C, FIGURE 9 and FIGURES 10A to 10C) where a strip of adhesive coated tape 22 has one end applied to the top of the wrapper 20, is passed along the seam between the opposed edges of the flaps 20a and 20b and then is folded upwardly and downwardly on top of the package as shown in FIGURE 10C. The resulting package as disclosed in FIGURES 11 and 12 has a wrapper 20 of corrugated board adhered to the tops, ends and bottoms of the bumper strips 13 and 14 and has its opposite edge portions 20a and 20b secured together by means of tape 22 extending around the ends of the package and overlapping the ends and the top of the wrapper 20.

The various mechanisms for accomplishing the operations described above will now be described.

*Bumper strip feeding mechanism*

All of the elements described herein after are mounted on and supported by a suitable framework 25 which may be of any desired structure and arrangement and preferably is so arranged that the components of the machine are in a suitable height for convenient feeding and observation by operating personnel.

Referring to FIGURES 1A and 2A, FIGURES 3 and 3A, the frame supports the two bumper strip feeding mechanisms 11 and 12 in substantially end-to-end relation. Each of the feeding devices has a shear 15 and 16 at the left-hand end thereof. The feeding mechanisms associated therewith in each unit are the same and accordingly only one of them will be described herein. The feeding mechanism 11 includes a hopper member 26 having end plates 27 and 28 and side plates 29 and 30 extending between or partially between the end plates 27 and 28. The arrangement of these elements is such as to receive a plurality or stack of bumper strip sheets 10 of the type shown in FIGURE 3. The sheets are composed of a semi-rigid, but crushable, foam plastic which has good impact resistance. Mitered corners 13a and 13b may be provided on each of the bumper strips, these corners being disposed adjacent to the corners of the book or other article being packaged therebetween to form a relief space so that if the corners of the bumper strips are crushed inwardly, they will not be pressed against and damage or dog-ear the corners of the book. A plurality of the bumper strips 13 are connected by means of narrow webs 13c and 13d also formed of foam plastic and preferably integral with the sheet 10.

Figure 2A:
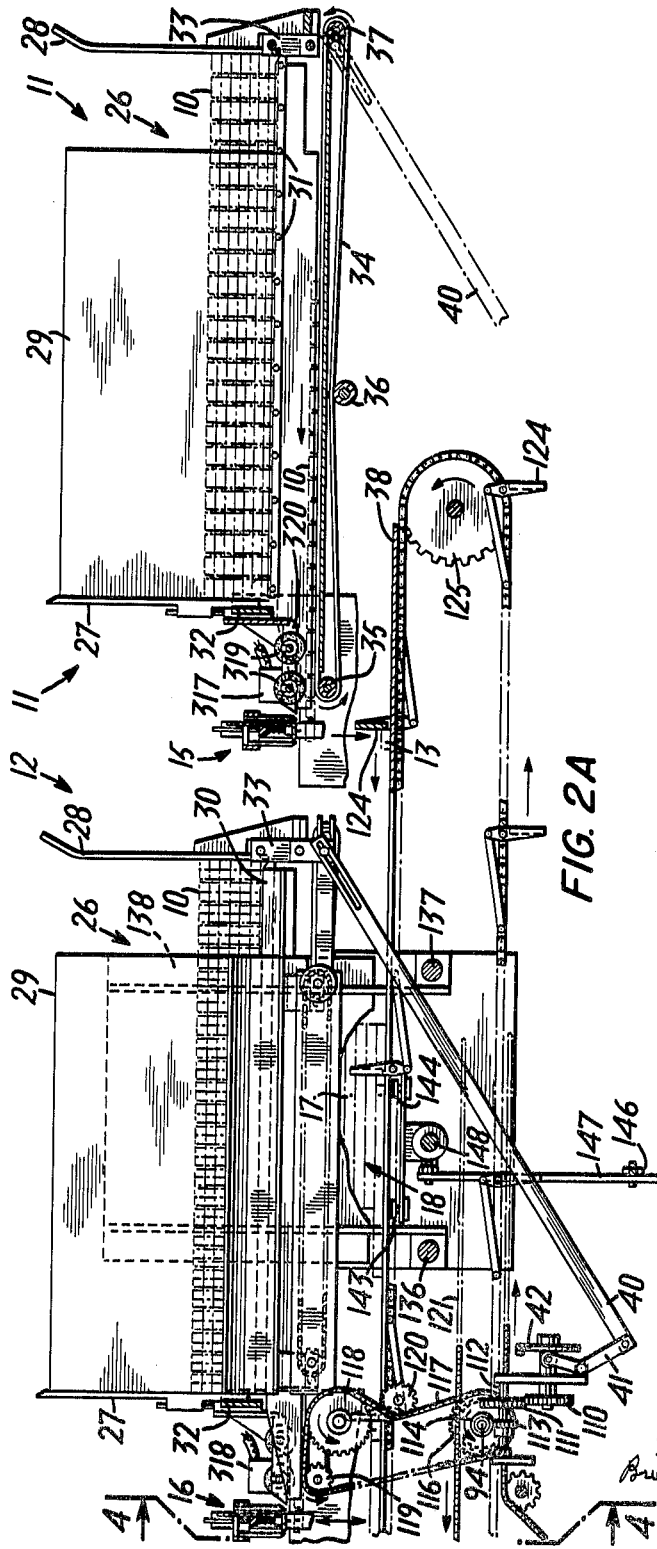

As best shown in FIGURE 3A, near the bottom of each side plate 29 and 30 is a row of inwardly projecting pins 31 which are spaced apart such a distance that when a sheet 10 of bumper strips is guided downwardly by the end plates 27 and 28, the pins will underlie the ends of a plurality of the bumper strips 13 thereby supporting one or more superimposed sheets within the hopper 26. In order to discharge a sheet 10 from the bottom of the hopper, the end plate 27 has a low edge supported on a cross frame member 32 (FIGURE 2A) above the level of the top surface of the sheet 10 engaged by the pins 31 as best shown in FIGURE 2A. A space is thereby provided at the left-hand end of the lowermost sheet 10 to enable it to be moved by means of a pivoted pusher member 33 (FIGURES 2A and 3A) a sufficient distance to align the pins 31 with the gaps formed by the mitered corners of the bumper strips 13 so that the lowermost sheet 10 can drop onto a receiving conveyor 34. Supporting rollers 35, 36 and 37 for the conveyor 34 are mounted on the frame of the machine and driven by means to be described hereinafter carrying the sheet 10 of bumper material to the left to enable successive bumper strips to be severed from the leading end of the sheet and disposed on another lower conveyer member 38. Actuation of the pusher member 33 which is supported on a pivot 39 (FIGURE 3A) is accomplished by means of a link 40 actuated by a bell crank 41 and a cam disk 42 driven in a manner to be described hereinafter so that successive sheets of bumper material are dropped onto the receiving conveyer 34 at just about the time that the last bumper strip of a preceding sheet is to be discharged downwardly onto the conveyer 38.

The feeding mechanisms 11 and 12 described above are particularly advantageous for handling material of the type of foam plastic for the reason that this material has relatively high friction characteristics and while light in weight and crushable is nevertheless difficult to slide relative to other sheets. The short movement required to drop the lowermost sheet from the stack is thereby advantageous in avoiding crushing of the bumper strip engaged by the pusher member 33. Moreover, the feeding mechanism allows sheets of the strips to be used which greatly facilitates the loading of the hopper.

It will be understood that other means for feeding bumper strips separately or in sheets may be used, if desired.

*The shear mechanism*

As indicated above, the shears 15 and 16 for cutting successive bumper strips 13 and 14 from the sheets 10 are the same and therefore only the shear member 16 will be described. Referring to FIGURES 1A, 2A, 4 and 5, the shear member 16 includes a pair of shear blades 45 and 46 which are mounted on a cross head 47 slidably mounted for up and down movement at one end on an upright 48 and fixed at its opposite end to a slide bar 49 slidably mounted on the machine frame 25. Both of the blades 45 and 46 have inclined cutting edges 45a and 46a which are adapted to pass through and shear the webs 13c and 13d which connect the bumper strips. In this way, the leading bumper strip 14 of FIGURE 5 is separated from the remainder of the sheet. Inasmuch as the conveyer 34 is continuously driven, stop means is provided for momentarily retarding the movement of the sheet 10. The stop means includes plate 50 on the cross head 47 facing the sheet 10 and having a wedge-shaped lower edge 50a. Also, to stop the forward movement of the sheet prior to a shearing operation, the blade 45 has disposed behind it an L-shaped stop member 51 (FIGURE 4) having a downwardly extending lower end 51a which is at all times disposed in the path of movement of the advancing sheet 10. The end 51a thereby positions the leading bumper strip 14 for severance by the blades 45 and 46.

To avoid breakage of the webs 13c and 13d and the formation of a ragged edge on the bumper strips, means are provided to support the leading bumper strip prior to and during part of the cutting operation. The supporting means includes a horizontally movable plate 52 which is disposed below the end 51a of the stop member 51 when the shear blades 45 and 46 are raised and is moved out of the downward path of the blades and other elements on the cross head 47 before the cross head moves downwardly. Also affording support during the early stage of downward movement of the cross head are a plurality of fingers 53 mounted on a transverse shaft 54 and a similar group of fingers 55 mounted on a parallel shaft 56. The fingers are normally urged toward each other by a coil spring 56a at one end of the shaft so that the upper ends of the fingers 53 and 55 underlie and temporarily support the strip 14 being severed. Both groups of the fingers are moved to positions allowing the severed strip 14 to pass between them by means of cam follower rollers 57 and 58 mounted on the right-hand ends of the shafts 54 and 56 as viewed in FIGURE 4. The rollers 57 and 58 engage the slide bar 49 slidably mounted in suitable brackets 60 and 61 on a side frame plate 62 on the machine. On the front and back of the slide bar 49 are wedge-shaped cam members 63 which upon downward movement of the bar 49 engage the rollers, force them apart and thereby swing the fingers 53 and 55 apart to allow the severed bumper strip to pass downwardly between them.

The plate 52 is moved back and forth by a slide shaft 64 at one end which is reciprocated by means to be described hereinafter.

Inasmuch as the bumper strip is formed of relatively light material, it will not normally fall downwardly onto the conveyer 38 in a predetermined position. Accordingly, means is provided in the shears 15 and 16 for successively displacing the strips downwardly and positioning them properly on conveyer 38. To that end, a vertically movable slide bar 59 and a transversely extending arm 59a thereon carry a stripping plate 65 having a horizontally disposed stripping and pressing flange 66 for engaging the top of a bumper strip 14, as viewed in FIGURE 5. Downward movement of the plate 65 will force the severed strip downwardly but will not prevent its lateral or endwise movement. Such movement is prevented by means of the positioning pins 67 and 68 which form extensions of rods 69 and 70 slidably mounted in bushings 73 and 74 mounted on the plate 65. Springs 75 and 76 are interposed between the bushings 73 and 74 and stop blocks 77 and 78 mounted on the rods 69 for biasing the pins 67 and 68 through holes in the flange 66. Accordingly, as the arm 59a moves downwardly, the pins 67 and 68 will penetrate the leading bumper strip 14, the flange 66 will engage its top surface and when the webs between the leading and trailing bumper strips are severed by the blades 45 and 46, the strip will be carried down past the shear blades into engagement with and accurately located with respect to the conveyer 38. In order to assure prompt release of the severed bumper strip 14, the rods 69 and 70 are provided with forwardly projecting stop members 80 and 81 which engage the ends of the outermost fingers 53 and thereby stop the movement of the rods 69 and 70 while the stripping flange 65 continues to move thereby stripping the bumper strip from the ends of the pins.

The mechanism for operating the components of the machine thus far described includes a drive motor 85 (FIGURES 2B and 6) mounted within the frame 25 and driven by means of reduction gears 86 and 87, a sprocket 88 which is connected by means of a chain 89 to a transverse main shaft 90 rotatably mounted in the frame 25 as shown in FIGURE 6. A sprocket 91 on the shaft 90 drives a chain 92 and thereby a sprocket 93 (FIGURE 4) fixed to a cam-shaft 94 rotatably mounted in frame members 62 and 95. Mounted on the shaft 94 are a pair of cam members 97 and 98 which cooperate with cam follower rollers 99 and 100, respectively, mounted on the actuating levers 101 and 102 which are pivotably supported at their left-hand end on one of the spacers 103 mounting the frame plate 95.

Lever 101 has a slot 104 in its right-hand end which receives pin 105 mounted on the slide bar 59 which supports and actuates the impaling pins and stripper plate.

Lever 102 has a slot 106 in its right-hand end receiving a pin 107 mounted on the slide bar 49 for reciprocating cross head 47 mounting the shear blades. Accordingly, when the shaft 94 is rotated, the cross head 47 and the slide bar 59 are reciprocated in timed relation to shear off the leading bumper strip, open the supporting fingers 53 and 55 and place the severed bumper strip on the conveyer 38. In operation, the cross head 47 moves downwardly only far enough to sever the bumper strip. On the other hand, the stripper plate 65 and the pins 67 and 69 with bumper strip impaled on them move downwardly relative to and beyond the shear blades 45 and 46 and between the supporting fingers 53 and 55 to place the strip 14 on the conveyer 38. The pins 67 and 68 are retracted during the last stage of movement of the stripper plate so that the bumper strip 14 is released as it engages the conveyer 38.

The drive mechanism also is connected to the pusher members 33 by means of which the sheets are disposed one by one on the conveyer 34. The cam member 42 (FIGURE 2A) is rotated by means of meshing gears 110 and 111, the latter being mounted on a shaft 112 carrying a worm gear 113 which is driven by means of a worm 114 mounted on the right-hand end of the cam-shaft 94. In this way, the cam 42 is driven at a lower speed than the shears 16 to cause a sheet of bumper strips to be discharged onto the conveyer 34 after a number of shearing operations equal to the number of bumper strips in a sheet 10. In this way, the sheets of bumper strips 10 are fed or supplied to the conveyer 34 of each unit at about the rate required for a continuous supply of strips.

A sprocket 116 on the cam-shaft 94 drives a chain 117 which passes around sprockets 118, 119 and an idler sprocket 120. Sprocket 119 drives the conveyer 34. The bumper strip feeder 11 and shear 15 are driven in the same manner by means of a chain 121 corresponding to or the same as chain 92.

A cam 122 rotatable with sprocket 118 oscillates a lever 123 which is linked to the slide shaft 64 for reciprocating the supporting plate 52.

*Book feeding mechanism*

As indicated above, the bumper strips are supplied to the conveyer 38 and in accordance with the invention are advanced in spaced apart relation in such a manner as to receive a book or other article therebetween. In order to assure positive advance of the bumper strips and book in engagement, the conveyer 38 is provided with a plurality of outwardly extending pusher plates 124 which are adapted to engage a bumper strip 13 discharged by the shear member 15. The conveyer 38 includes a pair of chains (FIGURES 1A and 2A) which extend around a pair of sprockets 125 and a second pair of sprockets 125a spaced lengthwise of the frame 25. A shaft 126 carries the sprockets 125a and a smaller sprocket 127 which is connected by means of a chain 128 to a sprocket 129 fixed to a counter-shaft 130. Another sprocket 129a on the shaft 130 is connected by means of a chain 131 to a sprocket 132 on the main drive shaft 90 (FIGURES 2B and 6). In this way, the conveyer 38 is driven in timed relation to the shears 15 and 16 to thereby assure the proper spaced relation between the bumper strips 13 and 14.

A lengthwise extending shaft 133 is also driven by the main shaft 90 by means of bevel gears.

The book feeding mechanism 18 shown in FIGURES 1A and 2A is of generally conventional type, including bars 136 and 137 which support a front plate 138 having guide flanges 139 and 140 thereon between which a stack of books, with the books in a horizontal position, is located. The lowermost book rests on longitudinally extending bars 141 and 142 which extend in a position closely adjacent to the conveyor 38. A pair of pushers 143 and 144 are arranged to engage the lowermost of the books and are reciprocated in the direction of the arrows by means of the crank 145 on the shaft 133. A link 146 connects the crank 145 to a lever 147 having its upper end connected to the pushers 143 and 144 which are slidably mounted on the rod 148 so that the lowermost book is pushed out from underneath the stack and is slid along the bars 141, 142 and pushed onto the conveyer 38 in front of the bumper strip 13. This operation is very fast inasmuch as the conveyer 38 is moving continuously. The book and the associated bumper strip 13 are pushed by a pusher member 124 and as they pass by the shear 16, a bumper strip 14 is dropped in front of the book and the three elements are then transferred to the wrapper supplying section 19 of the machine.

Wrapper supply and folding mechanism

FIGURES 1B, 2B, 6 and 7 best illustrate the wrapper supplying and folding mechanism. As shown in FIGURES 1B and 6, a frame 150 extends outwardly from the frame of the machine and includes a slotted top plate 151 having a back bar or guide 152 thereon and a front and side guide plate 153 arranged so that a slot 154 is provided between the supporting plate and the bottom edge of the front guide plate. The rear end of a stack of wrappers 20 is supported by means of flanged members 155 on the back guide 152 so that the lowermost wrapper 20 is disposed slightly above the surface of the plate 151.

A pusher 156 is slidably mounted on a shaft 157 extending lengthwise of the frame member 150 and is reciprocated lengthwise of the shaft by means of the crank 157a on the shaft 133, a link 158 and a lever 159 which is pivotally mounted at its lower end on a pivot 160. The upper end of lever 159 is connected by means of a link 162 to the pusher member which may be adjustable lengthwise thereof to accommodate wrappers of different lengths. Only one wrapper can be ejected at one time from the stack by reason of the presence of guide plate 163 which engages beneath the leading edge of the lowermost wrapper.

The movement of the pusher member 156 is sufficient to advance the lowermost sheet into a position to be gripped by sheet grippers 164 mounted on the parallel chains 165 and 166 and carried to a position overlying an assembly of a book and two bumper strips, then released by engagement of the grippers with a release cam 167 associated with each chain in the usual way. The sheet gripper and the wrapper feed is conventional in sheet feeding apparatus and is not believed to require further description except to state that the chains 165 and 166 are driven by means of suitable sprockets and a chain 168 from the shaft 92.

During the movement of the sheet into a position overlying a book and bumper assembly, adhesive is applied to the side edges of the sheet. Any suitable adhesive applying device 169 such as a heater and feeder for strips of thermoplastic adhesive, a roller applicator or a spray applicator may be used to apply a narrow strip, not exceeding the width of a bumper strip, to the edges of the wrapper 20 so that when it comes in contact with the bumper strips 13 and 14, it will adhere to them. The adhesive will not, however, come in contact with the book so that the wrapper is not adhered to the book between the bumper strips 13 and 14.

As indicated, the wrapper is placed on top of the book 17 and the bumper strips 13 and 14 and its protruding edges must be folded downwardly around the book and bumper strips to enclose their upper and lower surfaces and their edges as illustrated in FIGURES 11 and 12. To that end, and as shown in FIGURES 1B, 2B, 6 and 7, the conveyer 38 passes through a channel-like member 170 which is supported on standards 171 and 172 on a cross member 173 of the frame 25 of the machine. Above the channel member and also supported on the frame, is a folder which includes two plates 174 and 175 having outwardly curved lower edges mounted on the lower ends of upwardly extending arms 176 and 177 which are rotatably mounted on a shaft 178 carried at the outer end of a pair of levers 179 and 180 which are mounted on a rocker shaft 181. The arm 179 has a rearwardly extending lever arm 182 which is connected by means of a link 183 and a cam follower 184 to a cam 185 on the main drive shaft 90. To assure substantially vertical movement of the folding plates 174 and 175, a second pair of pivoted arms 179′ and 180′ are provided for each of the uprights 176 and 177.

The relation of the folding members 174 and 175 to the inverted channel member 170 is such that the folding members 174 and 175 pass downwardly around the sides of the channel member and thereby fold the protruding edge portions or flaps 20a and 20b of the wrapper around the outside of the channel member 170. The wrapper is not in contact with the book or the bumper strip at this time since the folding operation is intermittent and the movement of the book is continuous. In order to provide a sharp fold, at each edge, a holddown plate 187 is carried by a shaft 188 slidably mounted in a cross block or bar 189 which extends between the uprights 176, 177. A spring 190 urges the shaft 188 and the plate 187 downwardly against the wrapper 20. Also, the holddown plate is guided and retained against rotation by means of a guide rod 191 which is secured to the plate 187 and extends up through bracket 192 fixed to the cross member 189. The spring 190 allows the holddown plate to retract but maintains sufficient pressure to hold the middle portion of the wrapper 20 flat while its flaps are being folded.

Referring to FIGURE 2B, when a pusher 124 on the conveyer 38 passes through the channel member 170 with two bumper strips and a book between them, the pusher will engage the folded wrapper and will slide it off the channel member 170 on top of the book and bumper strips and in alignment therewith. The folding members 174 and 175 move down to cause the flaps 20a and 20b to be folded and then move upwardly to release the partially folded wrapper to enable it to be carried along by the pusher 124. As the wrapper moves off of the channel member 170, its adhesive coated edges engage the bumper strips 13 and 14 and will adhere to them. The assembly is carried by the conveyer 38 and transferred to another stage of the folder where the flaps 20a and 20b are folded underneath the book and bumper strips. As shown in FIGURES 1B and 2B, the second folder stage includes a pair of chains 195 and 196, each being provided with a plurality of generally T-shaped gripper members 197 and 198 spaced along the length of the chain to engage the wrapper at its opposite sides. Also the chains carry supporting L-shaped elements 199 and 200 spaced apart about the length of the combined book and bumper strip assembly which swing behind and support the trailing edge of the book and bumper. Also, a centrally located fixed bar 201 engages the book and bumper strips along their center line to prevent the book from moving downwardly.

A presser belt 202 bears against the upper surface of the wrapper 20 and aids in advancing it and holding it against the book and bumper strips during folding. Such folding is accomplished by means of the rotary, lobe-shaped folding members 203 and 203a which are disposed in a position to engage the downwardly folded flaps 20a and 20b and bend them inwardly and upwardly against the underside of the book and the bumper.

As best shown in FIGURES 1B and 2B, the chains 195 and 196 are supported on sprockets 204 and 205 at one end, and at the opposite end, FIGURES 1C and 2C, by the sprockets 207 and 208. A shaft 209 supports the sprocket 205 and a coresponding shaft 210 mounts the sprocket 204, the shaft in each case being driven by means of bevel gears 211, one of which is fixed to a cross shaft 212, driven by the chain 131 so that the inner flights of the chains 195 and 196 are driven in the same direction. Also, the shafts 209 and 210 carry smaller sprockets 215 and 216 which are connected by means of chains 217 and 218 to the sprockets 219 and 220 which drive or rotate the lobe-like folding members 203 and 203a. Thus it will be apparent that the folding members 203, 203a are driven in timed relation to the chains 195 and 196, and the belt 202 is driven also by means of a sprocket 222 at its left-hand end, FIGURES 1C and 2C, which in turn is driven by means of the chain 223 extending lengthwise of the machine from the shaft 212.

A package having a now completely folded wrapper is transferred by the chains 195, 196 and the belt 202 to a supporting conveyer 225 which is provided with upstanding pusher pins 226 along its length and carries the folded wrapper with the book and bumper strips beneath spring-biased presser members 227 and 228 and, if desired, through a labeller 229 where labels or the like are applied to the top of the wrapper 20. The conveyer 225 likewise is driven by means of the chain 223 which extends over a sprocket 230 fixed to the supporting shaft 231 at the right-hand end of the conveyer.

From the chamber 229, the folded wrapper, book and bumpers and strips therein are transferred by the conveyer 225 to the tape applicator of the machine.

*The tape applicator*

FIGURES 1C, 2C, 9 and FIGURES 10A to 10C illustrate the tape applicator. An overhead conveyer 235 provided with pushers 236 receives the package from the conveyer 225 and pushes it along a pair of spaced-apart bars 237 and 237a which extend lengthwise of the frame. Chain 223 also drives by means of sprocket 238, sprocket 239, sprocket 240 and a chain 241, the conveyer 235 at the same rate as the conveyer 225. Also driven by the chain 223 is another chain 242 which drives a sprocket 243 connected by means of a slip-clutch 243a for rotating the main drive shaft 244 of the tape applicator intermittently. Mounted on the shaft 244 is a gear 245 which meshes with a gear 246 connected with a drive roller 247 for advancing a strip of tape 22 to be applied to the package. In applying the tape 22, its leading end is projected in front of the package and above it, is pressed down on top of the package and the tape is then fed beneath the package as the latter is moved by the conveyer 235 to cover the free edges of the flaps 20a and 20b. A trailing end of the tape is bent up across the trailing end of the package and is bent forwardly and adhered to the top of the package.

Cooperating with the roller 247 is a roller 248 driven by means of a gear 249 thereon which is moved into and out of mesh with gear 246 by means of the cam follower member 250 which is slidable on the shaft 244 and has a follower roller 251 engaging an adjustable cam 252 also mounted on the shaft 244 and rotatable therewith. In order to adjust the length of the tape to be applied to the package, the cam 252 is composed of three relatively angularly adjustable sections each having a portion of the cam lobe 252a (FIG. 2C) thereon. The sections can be moved relatively around the shaft 244 and fixed relative thereto to change the length of the lobe 252a. The gears 246 and 249 are maintained in driving relation in proportion to the length of the lob 252a so that the length of the tape advanced by the rollers 247 and 248 likewise is proportional to the length of the lobe 252a. In this way a strip equal to the length of the package or, as described hereinafter, long enough to extend over the ends of the package can be provided. The roller 248 is further mounted on a lever 254 at each end which is supported by means of a pivot 253 at each end of the roller. In this way, by rotation of the gear 245 and rotation of the cam 252, the tape is fed intermittently in strips of predetermined length. Tape 22 is supplied from a roll 255 thereof which is supported on a frame 256 extending below the supporting rails of the frame 25. An idler roller 257 and a spring-biased slack takeup roller 258 directs the tape to a pair of guide rollers 259 and 260. An overrunning clutch 261 permits the roller 259 to rotate in only one direction so that the tape can be withdrawn only from the roll 255 but cannot be drawn back between the rolls 259 and 260. A friction brake member 262 bears against the surface of the roll 255 to control the tension on the tape. Tape can be drawn between the rolls 259 and 260 by the rotation of the tape feeding rolls 247 and 248, and due to frictional resistance of the brake 262, the spring 263 which biases the idler roll 258 will be stretched allowing the roll 258 to move toward the rolls 259 and 260 and supplying a length of tape. When the cam 252 separates the rollers 247 and 248, withdrawal of the tape is interrupted, but the overrunning clutch 261 prevents the tape from being pulled back by the spring 263 and the spring-biased roller 258 is pulled back by the spring 263 withdrawing tape from the roll 255 and restoring the loops between the rollers 257, 258, 259 and 260. When feeding of the tape is interrupted, a section thereof which has been advanced in contact with a glueing or wetting roller 265 is severed by means of a shear indicating a fixed blade 266a and a movable blade 266 mounted on the end of a lever 267 (FIGURE 1C) and actuated by means of a cam follower 268 reciprocated by means of a cam 269 on the shaft 244. The severed portion of the tape is advanced by means of the wetting or glue-applying roller 265 and the pressure roller 270 which are geared together and are driven by means of a gear 271 meshing with the gear 246. As the tape is fed upwardly it is guided by means of the presser roller 272 in front of a package moving along the slide bars 237 and 238. In order to apply the tape to the top of the package, the leading end is engaged by a pressing roller 273 and folded downwardly as the package moves to the left as viewed in FIGURE 2C. A downwardly extending pair of arms 274 pivotally mounted on a supporting plate 276 underlying the upper flight of the conveyer 235 carry the pressing roller 273. As the package moves to the left, the lower roller 272 presses the tape along the opposing edge portions of the flaps 20a and 20b through their entire lengths.

As indicated above, the shaft 244 is rotated intermittently. Such rotation is provided to assure proper application of a strip of tape to each package. To that end, operation of the tape applicator is controlled by means of a feeler roller 277 which is raised by successive packages and by means of linkage 278 raises a pawl 279 out of a notch 279a in a disk 279b fixed to the shaft 244 thereby permitting the shaft 244 to rotate 360° before being stopped by the pawl 279. Successive packages cause successive single rotations of the shaft 244 and the application of a strip of tape to successive packages.

Figure 10A:
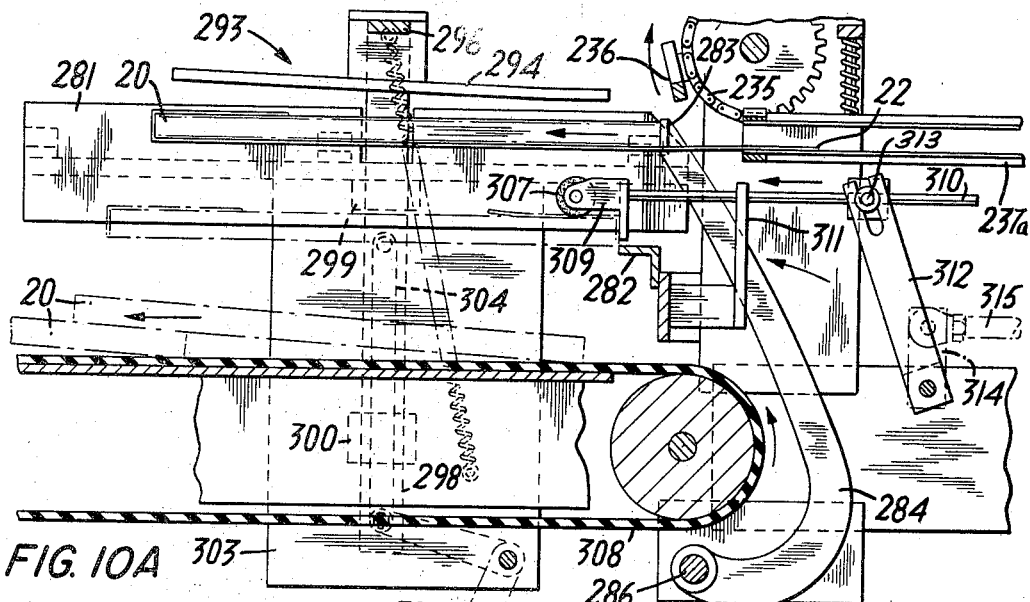
FIGURES 10A, 10B and 10C are views in section through another portion of the tape applicator showing the sequence of operations of folding the tape over one end of the package.
Figure 10B:
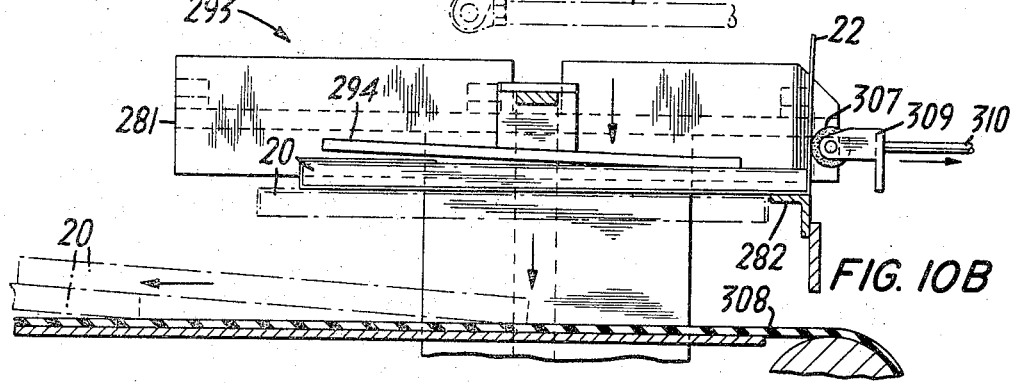
Figure 10C:
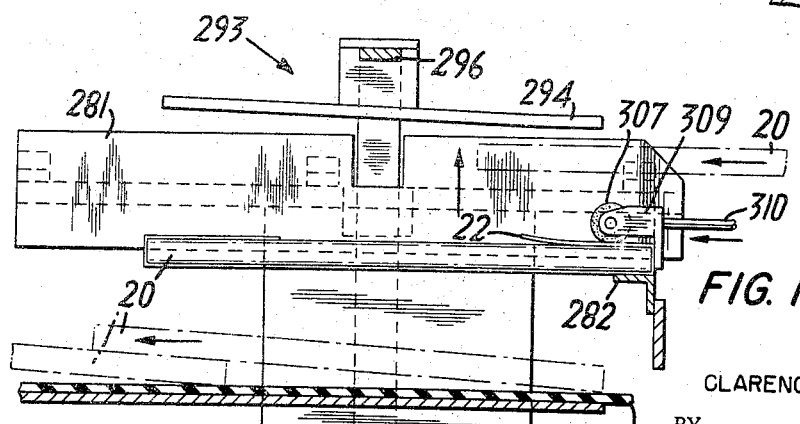

The cutoff knife 266 is actuated to cut the tape to provide a sufficient length of the tape to enable it to be folded around the trailing end of the package and partially across the top thereof by means of the mechanism best shown in FIGURES 10A to 10C.

A pair of spaced guide plates 280 and 281 receive the package from the conveyer 235 in a position in which the trailing edge of the package overlies an angle member 282. This movement and alignment is assisted by means of a pusher member including cross bars 283 supported on the ends of a pair of curved arms 284 and 285 mounted on a rockable pivot shaft 286. Rocking movement of the pusher member is produced by means of a lever 287 mounted on the end of the shaft 286 (FIGURE 1C), a link 288, and a cam 289 which engages a cam follower 290 on shaft 244 and connected to the link 288 by means of a pivoted lever 291. Rocking movement of the pusher member is timed with respect to the discharge of the partially taped package from the conveyer 235.

As shown in FIGURE 10A, the package with the tape 22 trailing from the end thereof is disopsed near the top of the bars 280 and 281 and is pushed down into a position engaging the angle member 282 as shown in FIGURE 10B by means of a vertically reciprocable discharge member 293. The discharge member is composed of a pair of plates 294 and 295 mounted on a cross bar 296 supported at its ends by slide members 297 and 298 guided in bushings 299 and 300 on frame members 303 on opposite sides of a conveyer 308. A bell crank 302 pivotally mounted on each frame member 303 is pivotally connected to a link 304 connected to each slide member. A link 305 connected to each bell crank and a cam 306 cause up and down movement of the discharge member 293. As the package is moved down by the discharge member, the trailing end of the tape engages a folding roller 307 and is quickly folded over the top surface of the package by movement of the roller 307 to the left from the position shown in FIGURE 10B to the position shown in FIGURE 10C. Upon the forward movement of the roller 307, the completed package is pushed from the angle member 282 onto the conveyer 308 and is carried away.

Movement of the taping roller 307 is accomplished as follows. It is mounted on a yoke 309 fixed to the end of a rod 310 guided in a flange 311 (FIGURE 10A) secured to the back of the angle member 282. Endwise reciprocation of the roller 307 and the rod 310 is accomplished by means of a lever 312 slidably connected to a pin 313 on the rod and actuated by means of a lever 314 and a link 315 which extends to the cam 316 and is provided with a cam follower 316' engaging the cam 306. In this way, movements of the discharge member 293 and the taping roller 307 are properly timed. Not all of the trailing edge of the tape is pressed against the top of the wrapper by the endwise movement of the roller 307. However, the tape is pressed completely into place by a succeeding package falling and resting on the tape as shown in FIGURES 10A to 10C.

All of the above operations take place in the timed relation, and the timing and the positioning of the elements can be appropriately adjusted by interchanging gears and the like in order to accommodate various sizes of articles, as may be required. For example, the taper can be adjusted to supply lengths of tape by appropriate changing of the gears therein. By the same token, the timing of the belts relative to the feed rate of the book to obtain different spacings of the bumper strips to accommodate books or other articles of different sizes can be accommodated by changing the gears or providing variable speed gearing for this purpose. Moreover, the apparatus can be provided with the usual safety switches at appropraite points in order to stop the operation of the machine if, for example, any of the parts fail to perform properly or the supply of bumper strips, wrappers or books should be exhausted inadvertently. To that end, safety switches 317 and 318 may be provided for the bumper strip feeding mechanisms as shown in FIGURE 2A.

Other safety switches may be provided on the book feeding and wrapper feeding apparatus and elsewhere as may be appropriate or necessary to provide uniform and consistent operation of the machine.

Further to control the movement and relation of the components of the package, the machine may be provided with guide elements where desired or required. For example, as shown in FIGURES 1A and 2A, each of the bumper strip feeders 11 and 12 may have gravity-urged pressure rollers 319 mounted in a support 320 and resting on the sheet 10 being advanced to the shear 15 or 16.

Also, inclined rollers 321 and 322 may be provided to engage and retain the flaps 20a and 20b of the wrapper downwardly when it is slipped from the supporting channel member 170 onto the bumper strips 13 and 14 and the article 17 as shown in FIGURES 1B and 2B.

Timing of the various components of the machine to enable elements of the package to be supplied intermittently to the continuously moving conveyers in the machine is most important, especially for the reason that most of the motions of the intermittent components occur in fractions of a second. The machine is capable of wrapping articles at the rate of sixty to eighty a minute.

While the specific embodiment of the invention has been described with reference to the wrapping of books, it will be understood that the apparatus is equally suitable for packaging such other articles as boxes of candy or other confections, parts which are relatively delicate and might be damaged by shipment, and the like. Accordingly, the form of the invention described herein should be considered as illustrative and variations in the drive mechanism and interconnection of the parts and other equivalent changes are within the scope of the invention as defined in the following claims.

I claim:

1. Packaging apparatus comprising first conveying means, means for placing a first semi-rigid bumper strip on said conveying means, means for placing a second semi-rigid bumper strip on said conveying means in spaced relation to said first bumper strip, means for placing an article on said conveying means between and in engagement with said bumper strips, means for positioning a wrapper over said article and said bumper strips, means for folding opposite edge portions of said wrapper downwardly adjacent to opposite edges of said article and opposite ends of said bumper strips, means on said conveying means for aligning said wrapper with said article and bumper strips and moving them into engagement, second conveying means for receiving said aligned wrapper, article and bumper strips, means adjacent to said second conveying means for folding said edge portions of said wrapper under said article and said bumper strips and into engagement therewith with opposite edges of said wrapper in opposed relation, and means for adhering a strip of tape to the wrapper along the opposed edges thereof, and to the opposite side of said wrapper adjacent to the ends thereof.

2. Packaging apparatus as set forth in claim 1 in which each means for placing a bumper strip on said conveying means comprises means for receiving a stack of sheets of interconnected bumper strips, each sheet having notches in its opposite edges, rows of projections on said receiving means for engaging opposite edges of the lowermost sheet in said stack between said notches, means for moving said lowermost sheet endwise to align the notches therein with said projections to release said lowermost sheet for movement between said projections, and a conveyor below said projections for receiving said released sheet and moving it endwise.

3. Packaging apparatus as set forth in claim 2 comprising shear means adjacent to said conveying means for severing successive bumper strips from said released sheet and placing said strips on said first conveying means.

4. Packaging apparatus comprising first conveying means, means for placing a first semi-rigid bumper strip on said conveying means, means for placing a second semi-rigid bumper strip on said conveying means in spaced relation to said first bumper strip, means for inserting an article between said bumper strips, means for moving a wrapper into a position above said first conveying means and said article and bumper strips thereon, means for applying an adhesive to opposite lateral edges of said wrapper parallel with said bumper strips, means for folding side portions of said wrapper downwardly on opposite sides of said conveying means and the article and bumper strips thereon, means for transferring said folded wrapper onto said article and bumper strips with the latter in contact with said adhesive, and means adjacent to the end of said first conveying means for folding said wrapper under said article and bumper strips with opposite edges of said wrapper in opposed relation to adhere the wrapper to the undersides of said bumper strips and enclose said article.

5. The packaging apparatus set forth in claim 4 comprising means for applying a strip of tape to said wrapper along the lengths of said opposed edges, upwardly over the end edges of said wrapper and lengthwise of the opposite side of said wrapper adjacent to the end edges thereof.

6. The packaging apparatus set forth in claim 4 in which each of said means for placing a bumper strip on said conveying means comprises a conveyor, means for supplying successive sheets of connected bumper strips to said conveyor, shear means for severing successive bumper strips from one end of said sheet and means movable with said shear means for impaling each severed bumper strip and placing it on said first conveying means.

7. The packaging apparatus set forth in claim 4 in which said means for folding said side portions of said wrapper downwardly comprises a channel member having side portions with upper free edges disposed on opposite sides of said first conveying means, said wrapper being received on said free edges of said side portions, vertically movable means substantially parallel with and disposed outwardly of said side portions for engaging said wrapper and bending it over said free edges and downwardly against said side portions of said channel member, and means for moving said vertically movable means in timed relation to said first conveying means.

8. The packaging apparatus set forth in claim 4 comprising other conveying means for receiving said article with the wrapper folded around it, means for moving said other conveying means to advance said article and wrapper in one direction, means adjacent to said other conveying means for advancing a strip of tape to be engaged by the leading end of said wrapper, means for folding an end of said tape against the top of said wrapper adjacent to said end, means for pressing said tape against the underside of said wrapper and along said opposed edges of said wrapper as said wrapper and said article are moved in said one direction, means for severing said tape and means adjacent to said other conveying means for engaging said severed end of said tape and bending it upwardly against the trailing end of said wrapper and forwardly over the top thereof.

9. Apparatus for supplying strips from a sheet composed of interconnected strips, said sheet having notches in at least two opposite longitudinal edges, comprising a conveyor, means for driving said conveyor, a supporting frame above said conveyor, said frame having spaced apart side members, a plurality of inwardly extending pins on said side members, said pins being spaced apart to engage edges of said sheet at points between the notches therein, means for displacing said sheet relative to said pins to align said notches with said pins and allow said sheet to pass between said side members and onto said conveyor, and means at one end of said conveyor for cutting successive strips from said sheet.

10. The apparatus set forth in claim 9 in which said means for cutting strips comprises a reciprocable shear member, means for reciprocating said shear member, another conveyor below said shear member, and means movable in timed relation to said shear for impaling successive cut strips and placing them on said another conveyor.

11. The apparatus set forth in claim 10 comprising means movable in timed relation to said shear means and relative to said impaling means for stripping said cut strip from said impaling means as said strip is placed on said another conveyor.

12. The apparatus set forth in claim 10 comprising means driving said sheet displacing means and reciprocating said shear member in timed relation to displace a sheet from said side members at intervals corresponding to the number of strips into which said sheet is cut.

13. A shearing mechanism for cutting strips from the leading end of an advancing sheet, comprising a conveyor for advancing a sheet endwise, at least one shear blade, means supporting said shear blade for reciprocation adjacent to one end of said conveyor, means for reciprocating said blade to cut a strip from said sheet, stop means adjacent to said blade for engaging the end of said sheet to predetermine the width of said strip, a platform adjacent to said conveyor for receiving and supporting said leading end of said strip, means for moving said platform horizontally into and out of alignment with said shear blade, a plurality of spring-biased pins for impaling said strip, stripping means supporting said pins for relative movement, and means for moving said stripping means and said pins into engagement with a strip for impaling it and carrying it beyond said shear blade and thereafter moving said stripping means relative to said pins to release said strip.

14. Apparatus for applying tape to packages comprising conveying means for moving packages successively along a path in one direction, means for advancing a strip of tape endwise in a direction to engage and extend beyond the leading end of a package, means for engaging the leading end of said tape extending beyond said package and pressing it against one surface of said package, means for pressing an intermediate portion of said tape against the opposite surface of said package through the entire length thereof, means adjacent to said conveying means for displacing said package at substantially a right angle to said one direction, a pressing member engageable with said trailing end of said tape for folding said tape around the end of said package as said package is displaced, and means for moving said pressing member toward the leading end of said package to press said tape against said one surface.

15. The apparatus set forth in claim 14 in which said means for advancing said tape endwise comprises a gear, means responsive to movement of a package by said conveying means for rotating said gear intermittently, a first pair of tape advancing rollers connected to said gear and driven thereby, a second pair of tape rollers, means connecting one of said second pair of rollers to said gear to drive said one roller, means for intermittently moving said second pair of rollers toward and away from each other to grip and release said tape and advance said tape predetermined distances, means for supplying tape for passage sucessively between said second pair of rollers and said first pair of rollers to advance said tape into engagement with said package, and shearing means between said pairs of rollers for cutting off predetermined lengths of tape.

16. The apparatus set forth in claim 15 comprising means for supporting a roll of tape, means adjacent to said second pair of rollers for engaging said tape and allowing movement thereof only toward said second pair of rollers, and spring biased means for maintaining a loop in said tape to compensate for intermittent gripping and advancing of said tape by said second pair of rollers.

17. The apparatus set forth in claim 14 comprising means for momentarily stopping displacement of said package at said right angle as said pressing member moves toward said leading end of said package.

References Cited by the Examiner

UNITED STATES PATENTS

| | | | |
|---|---|---|---|
| 42,779 | 5/1864 | Kennedy | 281—20 |
| 308,718 | 12/1884 | Weaver | 281—20 |
| 724,485 | 4/1903 | Miles | 53—210 |
| 1,491,269 | 4/1924 | Joplin | 53—32 |
| 1,938,654 | 12/1933 | Braven | 53—137 XR |
| 1,961,047 | 5/1934 | Horgan | 53—149 |
| 2,594,316 | 4/1952 | Kruger et al. | 53—137 XR |
| 2,643,169 | 6/1953 | Wells et al. | 221—119 XR |
| 2,691,856 | 10/1954 | Jensen et al. | 53—133 |
| 2,718,738 | 9/1955 | Mast et al. | 53—228 XR |
| 2,807,390 | 9/1957 | Bonebrake | 221—236 |
| 2,831,303 | 4/1958 | Hollis | 53—210 |
| 2,854,799 | 10/1958 | Griese et al. | 53—32 |

FRANK E. BAILEY, *Primary Examiner.*

ROBERT A. LEIGHEY, TRAVIS S. McGEHEE,
*Examiners.*